J. Y. D. MURPHY.
Corn-Planter.
No. 41,854
Patented Mar. 8. 1864.
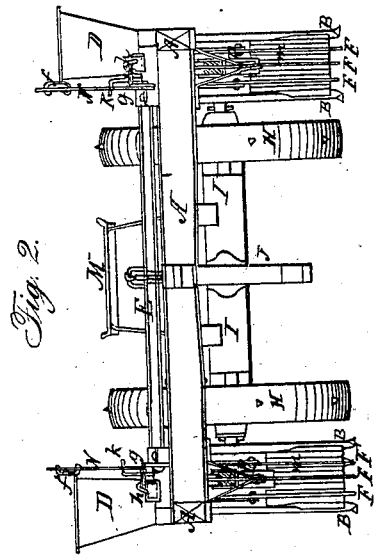
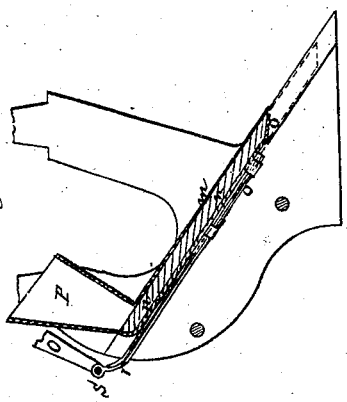
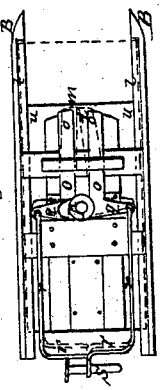
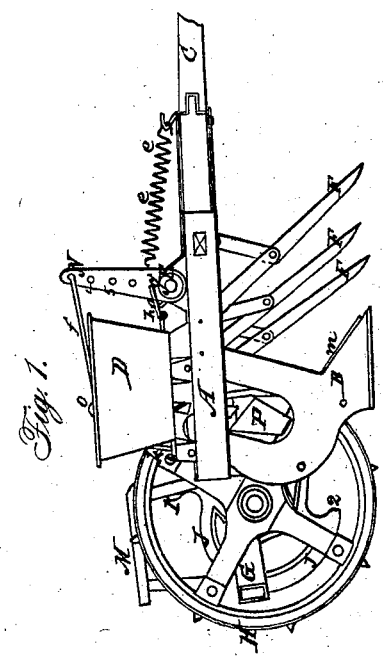
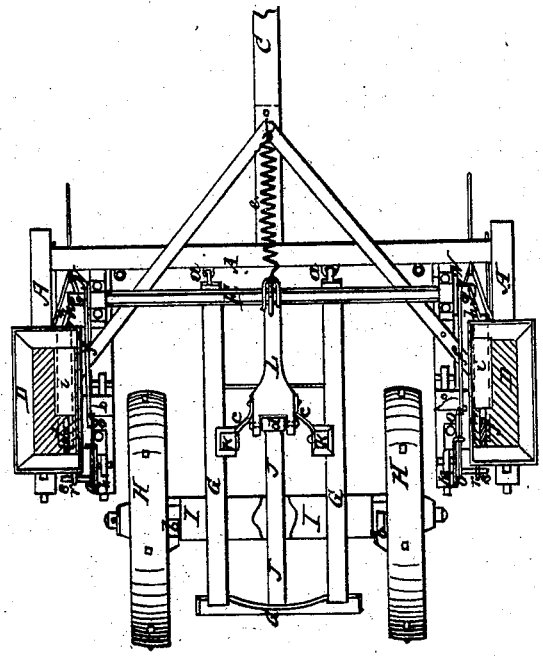
Witnesses:
Inventor:

UNITED STATES PATENT OFFICE.

J. Y. D. MURPHY, OF HALF MOON, PENNSYLVANIA.

IMPROVEMENT IN CORN-PLANTERS.

Specification forming part of Letters Patent No. 41,854, dated March 8, 1864.

*To all whom it may concern:*

Be it known that I, J. Y. D. MURPHY, of Half Moon, in the county of Centre and State of Pennsylvania, have invented certain new and useful Improvements in Corn-Planting Machines; and I do hereby declare the following to be a full, clear, and exact description of the same, reference being had to the accompanying drawings, making a part of this specification, in which—

Figure 1 represents a side elevation of the corn-planter. Fig. 2 represents a front elevation thereof. Fig. 3 represents a top plan, and Figs. 4 and 5 represent on an enlarged scale detached portions of the machine not distinctly seen in the other figures.

My invention relates more especially to the construction and arrangement of certain devices for taking the corn in measured quantities from the hopper, and conveying it thus measured to and dropping it into the furrows and covering them with the soil or earth.

To enable others skilled in the art to make and use my invention, I will proceed to describe the same in connection with the drawings.

A represents a frame, which is supported mainly by the side plates, B B B B, and partially by the tongue C, which guides it and causes it to follow the team. Upon this frame A is mounted the hoppers D D for containing the corn or other grains or seeds that are to be planted, as also the rock-shaft E, which operates the seed-slides through certain mechanism that will be hereinafter more fully described. To this frame A are also attached certain points or colters F in advance of the seed-dropping devices, for the purpose of pulverizing the soil and opening it up for the reception of the seed and guarding off stones, clods, &c., from the plates.

G is a secondary frame, hinged to the main frame A at *a a*, and carried upon two supporting-wheels, H H, which, when the machine moves forward, turn with their axle I, but which when the machine is backed or turns short around, are loose upon the axle, or may move independently of it by means of a ratchet-and-pawl arrangement at *b b*.

On the axle I, and at its central portion, there is arranged a cam-wheel, J, having two beats or throws, 1 2, made upon its outer perimeter, and to the pillar-blocks K K there is pivoted, by means of the hinged arms *c c*, a connecting-bar, L, the rear end of which carries a friction-roll, *d*, that works against the face of the cam-wheel J, and the forward end of which is pivoted to a short arm on the rock-shaft E, so that the forward motion of the bar L rocks the shaft in one direction while the spring *e* returns or rocks it in the opposite direction. The driver or operator's seat M is also arranged upon the secondary frame G.

At each end of the rock-shaft E there is an arm, N, furnished with adjusting-holes 3 4 5, &c.; and pivoted at or near the rear of the hoppers D there is a lever, *o*, also furnished with adjusting-holes, and this arm and lever are connected by a rod, *f*, which may be so arranged in any of the adjusting-holes as to give the necessary extent of vibration to the levers O to properly work the lower seed-slides.

In the bottoms of the hoppers there are openings, through which the seeds pass at certain intervals, and over these holes seed-slides (shown in red lines in Figs. 1, 2, 3) are caused to pass by means of the arms *g* on the rock-shaft, to which said slides are connected by links *h*.

*i* is a cap or shield in the bottom of the hopper, under which one blade of the seed-slide works, the other blade thereof moving underneath the bottom of the hopper. The opening through the bottom of the hopper may be enlarged or contracted by means of the blocks *j*, which slide in and out for that purpose.

Behind the levers *o* there are upright springs *k*, Fig. 2, against which said levers are forced when vibrated backward, so as to compress said springs. Their object and purpose is to give the slides an impulse at the first of their movement to aid them in returning quickly, the completion of the return movement being made by the spring *e*.

Between each of the pair of plates B, (and which might be appropriately called "shoes" or "plows,") and upon ways or ledges *l* made thereon for the purpose, the seeding mechanism (shown more distinctly in Figs. 4, 5) moves and is operated. This mechanism is constructed as follows:

*m* is a plate, upon the upper end of which is arranged a hopper, P, into which the grain drops from the main hopper when this second hopper is underneath the primary one and the seed-holes properly opened for that purpose. Underneath this top plate, m, there is a seed-passage, n, extending down to or near to its point or lower end. This seed-passage, or, rather, the exit from it, is controlled by two pivoted arms or levers, o o, hinged at p, and having bell-crank pieces q q connected to them, to which the rods r r are connected, said rods or yoke at their other ends being connected by a wrist-pin, s, to the lower end of the lever O. The slides are operated by means of this yoke or rods r r, and when the slide moves down toward the lower ends of the plates or shoes B, as shown in red lines in Figs. 4 and 5, the exit-opening t, whence the seeds drop into the furrow, is closed; but the moment that the yoke reverses its motion to draw up the slide and seeding mechanism the points of the arms o o are separated and uncover the exit-opening and allow the seed to drop into the furrow, and the soil that has accumulated on the plate m drops and covers the grain.

u u are small clearing-pins at the lower end of the plate m, for the purpose of pushing down any small roots or grass, which might otherwise impede the free motion of said plate and its accompanying mechanism.

In my patent of the 22d of January, 1861, I used a horizontal cutter and barrier in front of the side plates. In my present improvement I dispense with these devices entirely and leave the space between the plates free and unincumbered, and allow the sliding plate m to move clear up to the front of the side plates.

The advantage of placing the carrying and driving wheels H on an independent frame that is hinged to the main frame is that the seeding mechanism is not affected by the rising and falling of the wheels as they pass over the inequalities of the ground, and by hinging or pivoting the bar L to the rock-shaft on the main frame the two frames may have motions independent of each other without throwing out or cramping the driving-connection between them.

The advantage of the three springs e k k for closing or raising the plates is as follows: If the spring e alone were used, it would require so much power to strain it as to cause the machine to work hard and make the wheels slip; but when the spring e is just strong enough to carry up the plates, and the upright springs k gives the impulse at the start, the plates start quickly and require but little power, from the fact that the upright springs are not brought into action until the plates are almost down, at which time the grade or throw on the cam-wheel J is much the lightest, and of course can exert more power with less tendency of the drive-wheels to slip.

Having thus fully described my invention, what I claim is—

1. In combination with the side plates, B, unobstructed at their forward ends, a sliding seeding mechanism composed of a grain duct or passage, n, and the bell-crank levers or arms O for opening and closing the same, substantially in the manner and for the purpose described.

2. In combination with the sliding plates and their grain ducts or passages, the hoppers P, attached thereto and operating in connection with the seed-hoppers D, substantially as described.

3. The combination of the three springs e k k with the cam and with the plates m m, for the purpose of more readily raising up the plates without requiring so much resistance as one spring alone would require from the drive-wheels to compress it, as hereinabove described and represented.

J. Y. D. MURPHY.

Witnesses:
  JOHN H. LEVER,
  D. H. BURKET.